United States Patent
Choi et al.

(10) Patent No.: US 9,456,367 B2
(45) Date of Patent: Sep. 27, 2016

(54) MULTI-PATH SEARCH APPARATUS AND METHOD IN A WIRELESS COMMUNICATION SYSTEM

(71) Applicant: Samsung Electronics Co., Ltd., Suwon-si, Gyeonggi-do (KR)

(72) Inventors: Sang-Won Choi, Yongin-si (KR); Seung-Hwan Won, Hanam-si (KR); Myung-Joon Shim, Suwon-si (KR); Jong-Gun Moon, Suwon-si (KR); Jong-Yoon Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 14/338,601

(22) Filed: Jul. 23, 2014

(65) Prior Publication Data

US 2015/0029878 A1 Jan. 29, 2015

(30) Foreign Application Priority Data

Jul. 26, 2013 (KR) ........................ 10-2013-0089005

(51) Int. Cl.
*H04W 24/08* (2009.01)
*H04B 1/7113* (2011.01)
*H04B 17/309* (2015.01)
*H04L 25/02* (2006.01)
*H04W 52/12* (2009.01)

(52) U.S. Cl.
CPC ............ *H04W 24/08* (2013.01); *H04B 1/7113* (2013.01); *H04B 17/309* (2015.01); *H04L 25/0226* (2013.01); *H04W 52/12* (2013.01)

(58) Field of Classification Search
CPC .. H04W 24/08; H04W 52/12; H04B 1/7113; H04B 17/309; H04L 25/0226
See application file for complete search history.

(56) References Cited

U.S. PATENT DOCUMENTS

| | | | | |
|---|---|---|---|---|
| 2004/0240533 | A1* | 12/2004 | Kitagawa | H04B 1/7095 375/150 |
| 2007/0098116 | A1* | 5/2007 | Kim | H04B 1/70735 375/343 |
| 2007/0133611 | A1* | 6/2007 | Li | H04L 27/0014 370/503 |

FOREIGN PATENT DOCUMENTS

| | | |
|---|---|---|
| CN | 101127973 A | 2/2008 |
| CN | 201018489 Y | 2/2008 |

* cited by examiner

*Primary Examiner* — Jae Y Lee
(74) *Attorney, Agent, or Firm* — Jefferson IP Law, LLP

(57) ABSTRACT

A multi-path search apparatus and a method in a wireless communication system are provided. The multi-path search apparatus includes a correlator configured to get a 1st correlation value between a received signal and a 1st code, and to get a 2nd correlation value between the received signal and a 2nd code, a coupler configured to couple the 1st correlation value and the 2nd correlation value, and a multi-path information generator configured to get the correlation energy of the output of the coupler and to generate multi-path information.

22 Claims, 17 Drawing Sheets

MULTI-PATH SEARCH APPARATUS AND METHOD IN A WIRELESS COMMUNICATION SYSTEM

CROSS-REFERENCE TO RELATED APPLICATION(S)

This application claims the benefit under 35 U.S.C. §119(a) of a Korean patent application filed on Jul. 26, 2013 in the Korean Intellectual Property Office and assigned Serial number 10-2013-0089005, the entire disclosure of which is hereby incorporated by reference.

TECHNICAL FIELD

The present disclosure relates to path search of a wireless communication system. More particularly, the present disclosure relates to a multi-path search apparatus and method in the wireless communication system.

BACKGROUND

In a wireless communication system, such as a Code Division Multiple Access (CDMA) system, a multi-path searcher makes possible an acquisition of timing and energy values of signals received through random fading channel paths.

The implementation of the multi-path searcher can be different according to whether a pilot signal is transmitted. For example, in a case of a Frequency Division Duplex (FDD) system, the multi-path searcher performs a search operation using a continuous pilot channel. In another example, in a case of a Time Division Duplex (TDD) system, the multi-path searcher performs a search operation using a discontinuous pilot signal. As such, the implementation of a specialized multi-path searcher can be different depending upon the communication method. At present, the multi-path searcher may search a multipath using only a pilot signal specified in a standard. In this regard, there is a limit in the performance of multi-path search and the performance of the whole system.

Therefore, a need exists for a method and apparatus with a more efficient utilization of metrics and resources for obtaining information per path in a multiple path search.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a multi-path search apparatus and method capable of improving the performance of multi-path search and the performance of the whole system by searching a multipath using even a signal other than an existing pilot signal in a wireless communication system.

Another aspect of the present disclosure is to provide a multi-path search apparatus and method capable of improving the reliability of a correlation value being a basis of the performance of multi-path search by efficiently utilizing several metrics and resources in getting information per path in a Time Division Duplex (TDD) communication system.

The above aspects are achieved by providing a multi-path search apparatus and method in a wireless communication system.

In accordance with an aspect of the present disclosure, a multi-path search apparatus in a wireless communication system is provided. The multi-path search apparatus includes a correlator configured to get a 1st correlation value between a received signal and a 1st code, and to get a 2nd correlation value between the received signal and a 2nd code, a coupler configured to couple the 1st correlation value and the 2nd correlation value, and a multi-path information generator configured to get the correlation energy of the output of the coupler and to generate multi-path information.

In accordance with another aspect of the present disclosure, a multi-path search apparatus for a terminal of a TDD wireless communication system is provided. The multi-path search apparatus includes a 1st correlator configured to get a 1st correlation value between a received signal and a 1st code including a pilot signal component for downlink synchronization, a 2nd correlator configured to get a 2nd correlation value between the received signal and a 2nd code including a signal component for channel estimation, a coupler configured to coherently or noncoherently couple the 1st correlation value and the 2nd correlation value, and a multi-path information generator configured to get the correlation energy of the output of the coupler and to generate multi-path information.

In accordance with a further aspect of the present disclosure, a multi-path search method in a wireless communication system is provided. The multi-path search method includes getting a 1st correlation value between a received signal and a 1st code, getting a 2nd correlation value between the received signal and a 2nd code, coupling the 1st correlation value and the 2nd correlation value and outputting a coupled correlation value, and getting the correlation energy of the coupled correlation value and generating multi-path information.

In accordance with yet another aspect of the present disclosure, a multi-path search method for a terminal of a TDD wireless communication system is provided. The multi-path search method includes getting a 1st correlation value between a received signal and a 1st code including a pilot signal component for downlink synchronization, getting a 2nd correlation value between the received signal and a 2nd code including a signal component for channel estimation, coupling the 1st correlation value and the 2nd correlation value and outputting the coupled correlation value, and getting the correlation energy of the coupled correlation value and generating multi-path information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
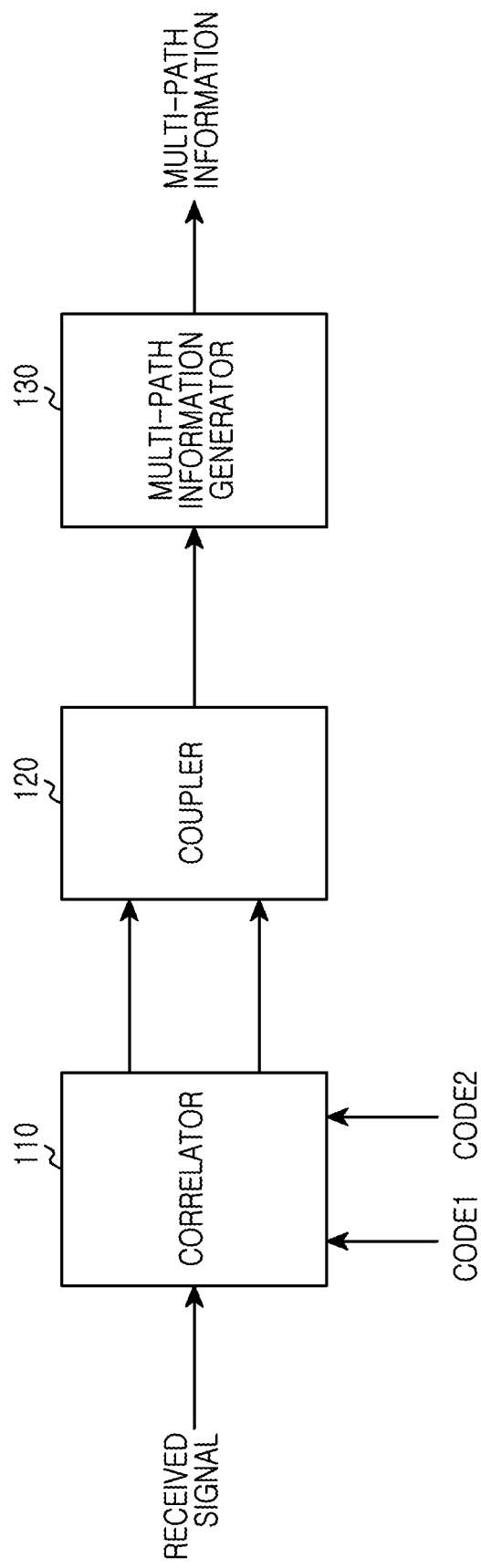
FIG. 1 is a block diagram illustrating a construction of a multi-path search apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 to 15 and various embodiments discussed below, which are used for describing the principles of the disclosure in this patent document, are merely for illustration, and should not be interpreted as limiting the scope and spirit of the disclosure. It will be understood by those skilled in the art that the below described embodiments can be implemented in any wireless communication system to which the disclosure is suitably applied.

Various embodiments of the present disclosure described below propose a multi-path search apparatus and method capable of improving the performance of multi-path search and the performance of the whole system by searching a multipath using a signal other than an existing pilot signal used for a multi-path search operation in a wireless communication system. In, certain various embodiments of the present disclosure propose the multi-path search apparatus and method capable of, to improve an average code acquisition time and reliability of an initial synchronization process, searching a multipath and exhibiting robust performance against channel fading, dynamic channel, and frequency/time offset when voice/data communication is accomplished after the initial synchronization, in a Time Division Duplex (TDD) Code Division Multiple Access (CDMA) downlink system. By additionally utilizing a signal (e.g., a midamble code) for channel estimation allocated to a downlink slot as well as a pilot signal (e.g., a SYNC_DL code) for downlink synchronization specified in a specification, the multi-path search apparatus increases the performance of detection of a multi-path searcher, improving the whole system performance.

FIG. 1 is a block diagram illustrating a construction of a multi-path search apparatus according to an embodiment of the present disclosure.

Referring to FIG. 1, the multi-path search apparatus includes a correlator 110, a coupler 120, and a multi-path information generator 130. The correlator 110 gets a 1st correlation value between a received signal and a 1st code, and gets a 2nd correlation value between the received signal and a 2nd code. The 1st code can be a code of a Gold code series. For example, the 1st code can include a pilot signal component for link synchronization. The 2nd code can be a code of a Pseudo Noise (PN) code series. For example, the 2nd code can include a signal component for channel estimation.

The coupler 120 can coherently or noncoherently couple the 1st correlation value and 2nd correlation value obtained by the correlator 110, and output the coupling result. The multi-path information generator 130 gets a path metric (or correlation energy) of the output of the coupler 120 and generates multi-path information.

A quantizer for quantizing a received signal to a predefined level and providing the quantized signal to the correlator 110 can be connected to a front end of the correlator 110.

A filtering unit for filtering some path positions among path positions configuring multi-path information and outputting refined multi-path information can be connected to a rear end of the multi-path information generator 130.

Also, a reference timing acquirer for acquiring reference timing using the filtered multi-path information, a multi-path position searcher for searching a multi-path position using the filtered multi-path information, or a channel profile estimator for estimating a channel profile using the filtered multi-path information can be connected to a rear end of the filtering unit.

Figure 2:
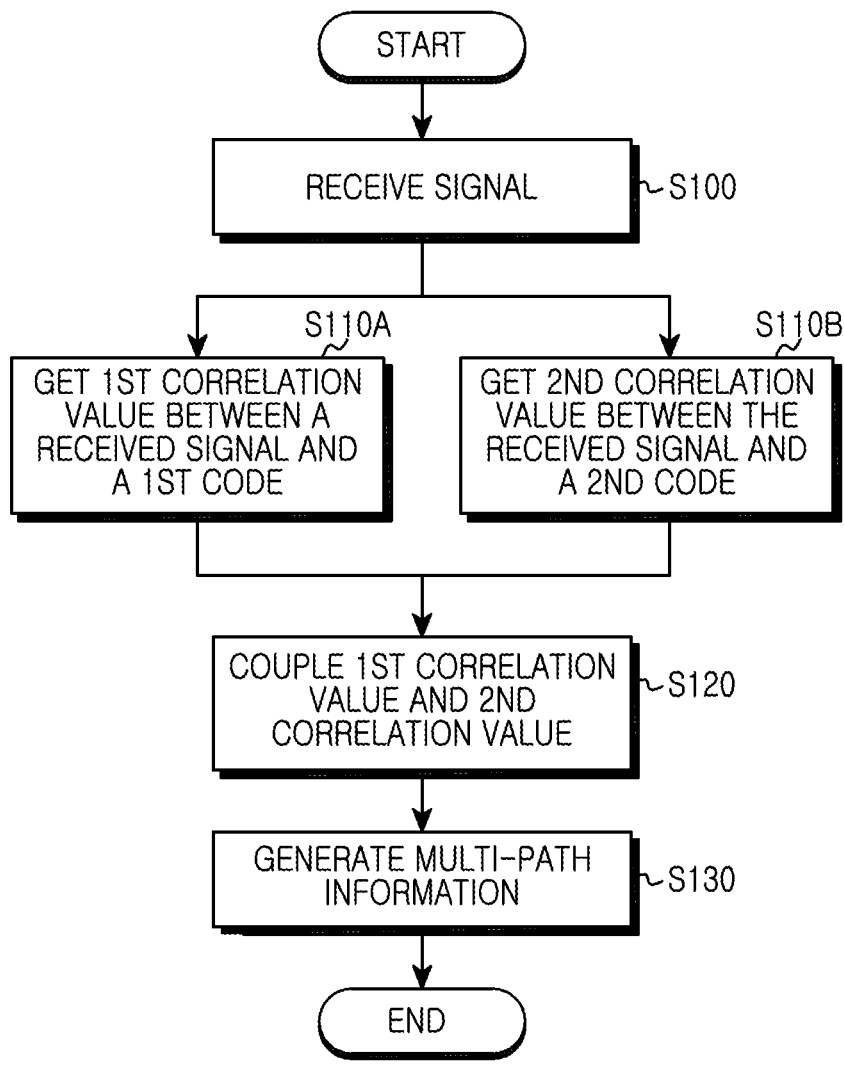
FIG. 2 is a flowchart illustrating a multi-path search operation according to an embodiment of the present disclosure.

FIG. 2 is a flowchart illustrating a multi-path search operation according to an embodiment of the present disclosure.

Referring to FIG. 2, this operation can be carried out by the multi-path search apparatus illustrated in FIG. 1, for example. In operation S100, the correlator 110 of FIG. 1 receives a signal. In operation S110A, the correlator 110 gets a 1st correlation value between a received signal and a 1st code. In operation S110B, the correlator 110 gets a 2nd correlation value between the received signal and a 2nd code. The 1st code can be a code of a Gold code series. For example, the 1st code can include a pilot signal component for link synchronization. The 2nd code can be a code of a PN code series. For example, the 2nd code can include a signal component for channel estimation.

In operation S120, the coupler 120 coherently or noncoherently couples the 1st correlation value and 2nd correlation value obtained by the correlator 110, and outputs the coupling result. In operation S130, the multi-path information generator 130 gets a path metric (or correlation energy) of the output of the coupler 120, and generates multi-path information.

Figure 3:
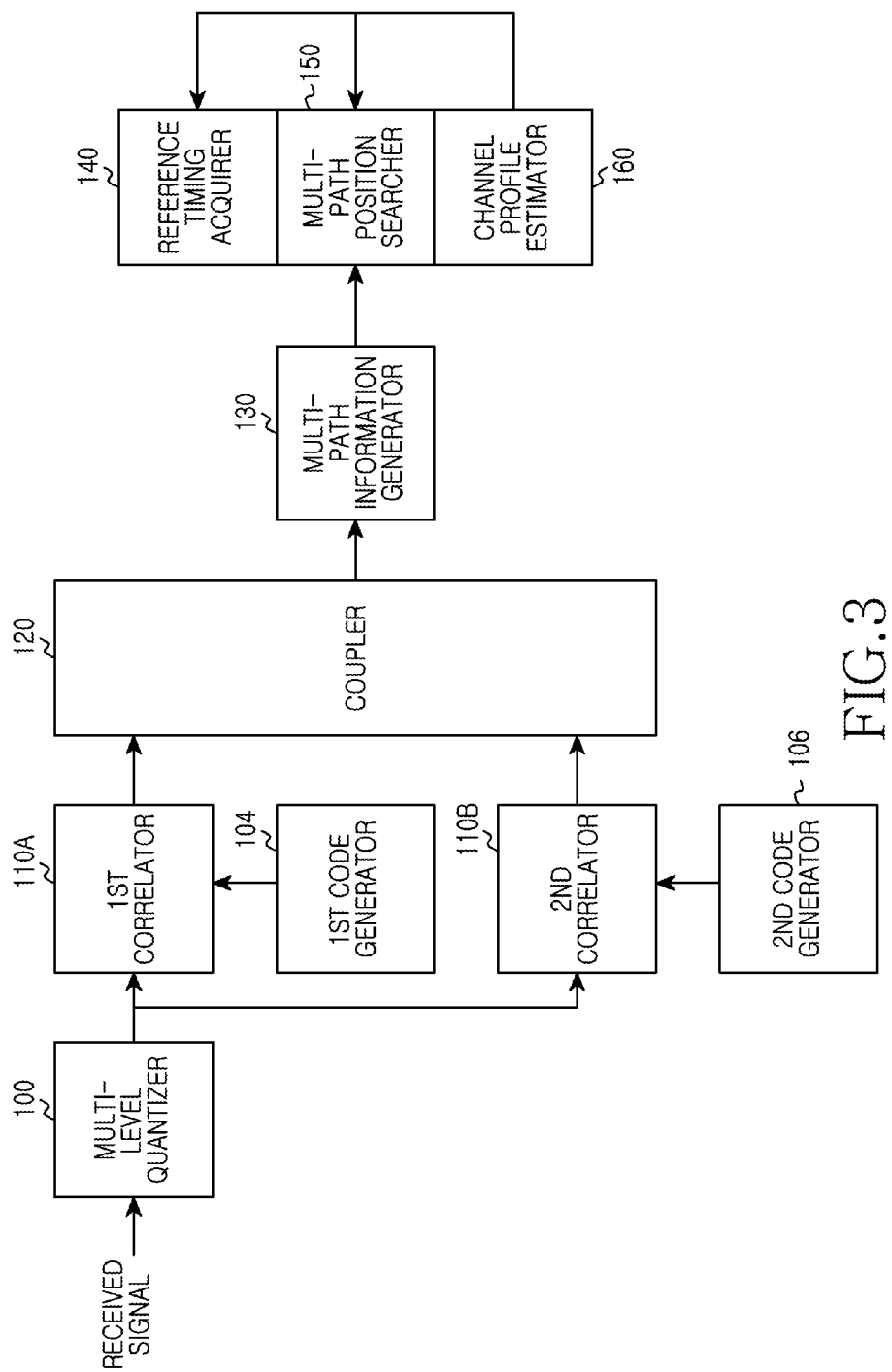
FIG. 3 is a block diagram illustrating a construction of a multi-path search apparatus according to an embodiment of the present disclosure.

FIG. 3 is a block diagram illustrating a construction of a multi-path search apparatus according to an embodiment of the present disclosure.

Referring to FIG. 3, this multi-path search apparatus can be used for a terminal of a TDD wireless communication system (e.g., CDMA system). In FIG. 3, the multi-path search apparatus a 1st code generator 104, a 2nd code generator 106, a 1st correlator 110A, a 2nd correlator 110B, a coupler 120, and a multi-path information generator 130. The multi-path search apparatus can further include a multi-level quantizer 100. Also, the multi-path search apparatus can further include a reference timing acquirer 140, a multi-path position searcher 150, and a channel profile estimator 160.

The 1st code generator 104 generates a 1st code, and the 2nd code generator 106 generates a 2nd code. For example, the 1st code can be a code of a Gold code series including a pilot signal component for downlink synchronization, and the 2nd code can be a code of a PN code series including a signal component for channel estimation. If the TDD CDMA system is a Time Division-Synchronous CDMA (TD-SCDMA) system or a Time Duplex-High Speed DownLink Access (TD-HSPA) system, the 1st code can be a SYNC_DL code, and the 2nd code can be a midamble code allocated to a downlink slot, as described with reference to FIGS. 4 to 6 below.

Figure 7:
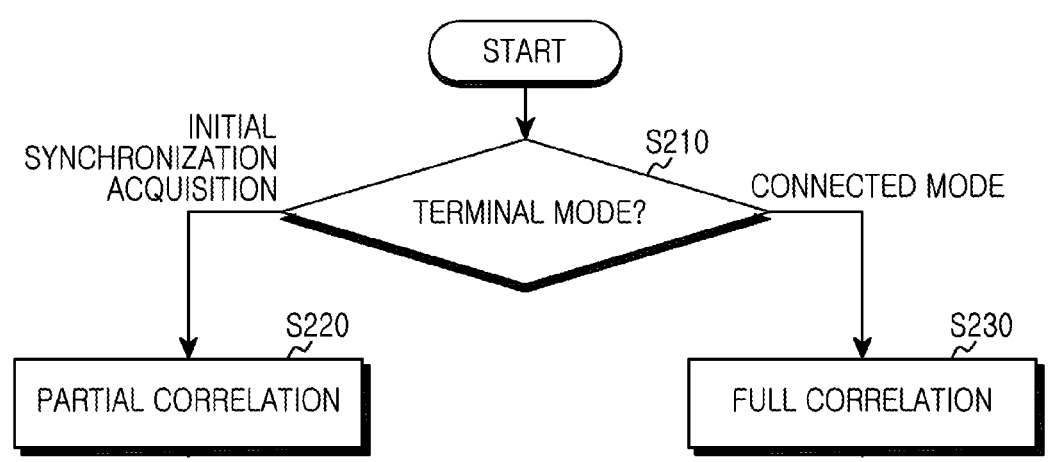
FIG. 7 is a flowchart illustrating an operation of a correlator according to an embodiment of the present disclosure.

The 1st correlator 110A gets a 1st correlation value between a received signal and the 1st code including the pilot signal component for downlink synchronization. The 2nd correlator 110B gets a 2nd correlation value between the received signal and the 2nd code including the signal component for channel estimation. The 2nd correlator 110B can perform a different correlation operation according to an operation mode (i.e., an initial synchronization acquisition mode and a connected mode) of a terminal as illustrated in FIG. 7 below.

Figure 4:
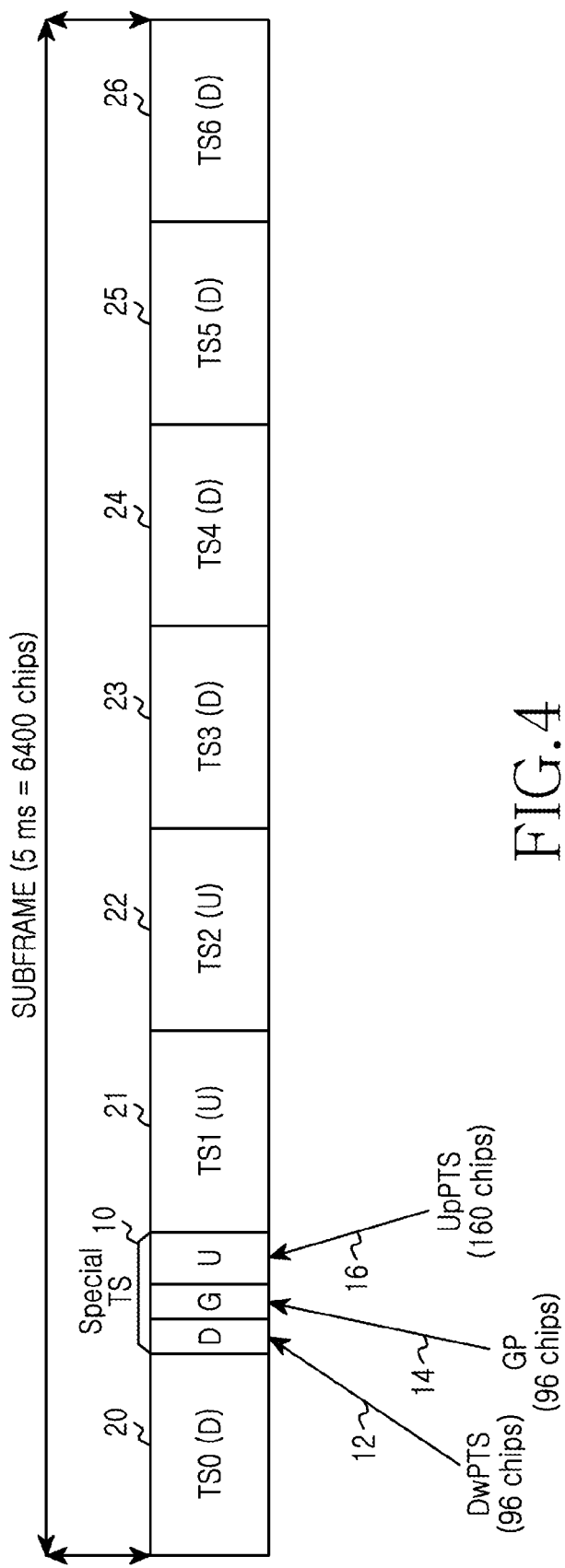
FIG. 4 is a diagram illustrating an example of a structure of a subframe for a signal received by a multi-path search apparatus according to an embodiment of the present disclosure.

For example, in the initial synchronization acquisition mode, the 2nd correlator 110B gets the 2nd correlation value using all midamble codes included in the first downlink Time Slot (TS) (i.e., TS0 (D) 20 of FIG. 4) of a received signal. For another example, in the connected mode, the 2nd correlator 110B gets the 2nd correlation value using midamble codes allocated to each of downlink time slots (i.e., TS3 (D) 23, TS4 (D) 24, TS5 (D) 25, and TS6 (D) 26 of FIG. 4) of the received signal.

The coupler 120 couples the 1st correlation value obtained by the 1st correlator 110A and the 2nd correlation value obtained by the 2nd correlator 110B. The multi-path information generator 130 obtains the correlation energy (or path metric) of the output of the coupler 120 and generates multi-path information. The multi-path information generator 130 generates the multi-path information from correlation power obtained using a correlation characteristic of a pilot signal, but it may be possible to utilize other metrics and get the multi-path information as well.

The multi-level quantizer 100 quantizes a received signal to a predefined level and provides the quantized signal to the 1st correlator 110A and the 2nd correlator 110B.

The filtering unit (i.e., item 135 of FIG. 8) filters some path positions among path positions configuring multi-path information generated by the multi-path information generator 130, and outputs refined multi-path information.

The reference timing acquirer 140 acquires reference timing using multi-path information filtered by the filtering unit 135. The multi-path position searcher 150 searches a multi-path position using the multi-path information filtered by the filtering unit 135. The channel profile estimator 160 estimates a channel profile using the multi-path information filtered by the filtering unit 135.

FIG. 4 is a diagram illustrating an example of a structure of a subframe for a signal received by a multi-path search apparatus according to an embodiment of the present disclosure, for instance, the multi-path search apparatus illustrated in FIG. 3. As an example, a subframe structure of a TD-SCDMA system is illustrated.

Referring to FIG. 4, a subframe includes DownLink (DL) Time Slots (TS0 (D) 20, TS3 (D) 23, TS4 (D) 24, TS5 (D) 25, and TS6 (D) 26), UpLink (UL) time slots (TS1 (U) 21 and TS2 (U) 22), and a special TS 10. The special TS 10 includes a Guard Period (GP) 14, a Downlink Pilot Time Slot (DwPTS) 12 in which a pilot signal for downlink synchronization is loaded, and an Uplink Pilot Time Slot (UpPTS) 16 in which a pilot signal for uplink synchronization is loaded. For example, the DwPTS 12 and the GP 14 each can be a period of 96 chips, and the UpPTS 16 can be a period of 160 chips, and the subframe can be a period of 5 milliseconds (ms)=6400 chips.

Figure 5A:
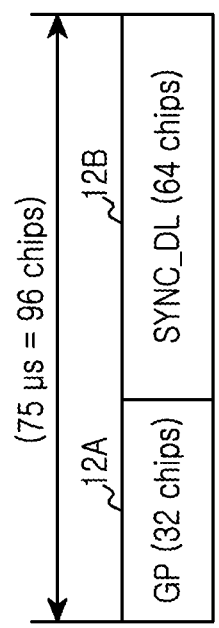
FIGS. 5A, 5B, and 5C are diagrams illustrating an example of a structure of time slots included in a subframe according to an embodiment of the present disclosure.
Figure 5B:
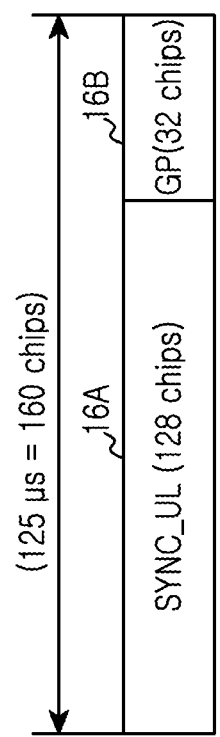
Figure 5C:
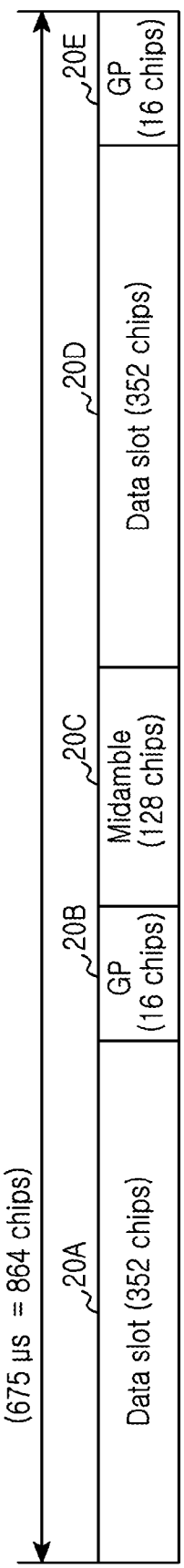

FIGS. 5A, 5B and 5C are diagrams illustrating an example of a structure of time slots included in a subframe according to an embodiment of the present disclosure, for example, the subframe illustrated in FIG. 4.

Referring to FIG. 5A, the DwPTS 12 of FIG. 4 includes a GP 12A, and a period (SYNC_DL) 12B in which a pilot signal for downlink synchronization is loaded. For example, the DwPTS 12 can include a period of 75 microseconds (μs)=96 chips that includes the GP 12A of 32 chips and the period (SYNC_DL) of 64 chips in which the pilot signal for downlink synchronization is loaded.

Referring to FIG. 5B, the UpPTS 16 of FIG. 4 includes a period (SYNC_UL) 16A in which a pilot signal for uplink synchronization is loaded, and a GP 16B. For example, the UpPTS 16 can include a period of 125 μs=160 chips that includes the period (SYNC_UL) 16A of 128 chips in which the pilot signal for uplink synchronization is loaded and the GP 16B of 32 chips.

Referring to FIG. 5C, the TS0 (D) 20, TS3 (D) 23, TS4 (D) 24, TS5 (D) 25, and TS6 (D) 26 of FIG. 4 include two data slots 20A and 20D for data transmission, a midamble period 20C for channel estimation, and the like, respectively.

A GP 20B is included between the data slot 20A and the midamble period 20C, and a GP 20E is included at a rear end of the data slot 20D. For example, the data slots 20A and 20D can be a period of 352 chips, respectively, and the GPs 20B and 20E can be a period of 16 chips, respectively, and the midamble period 20C can be a period of 128 chips.

Figure 6:
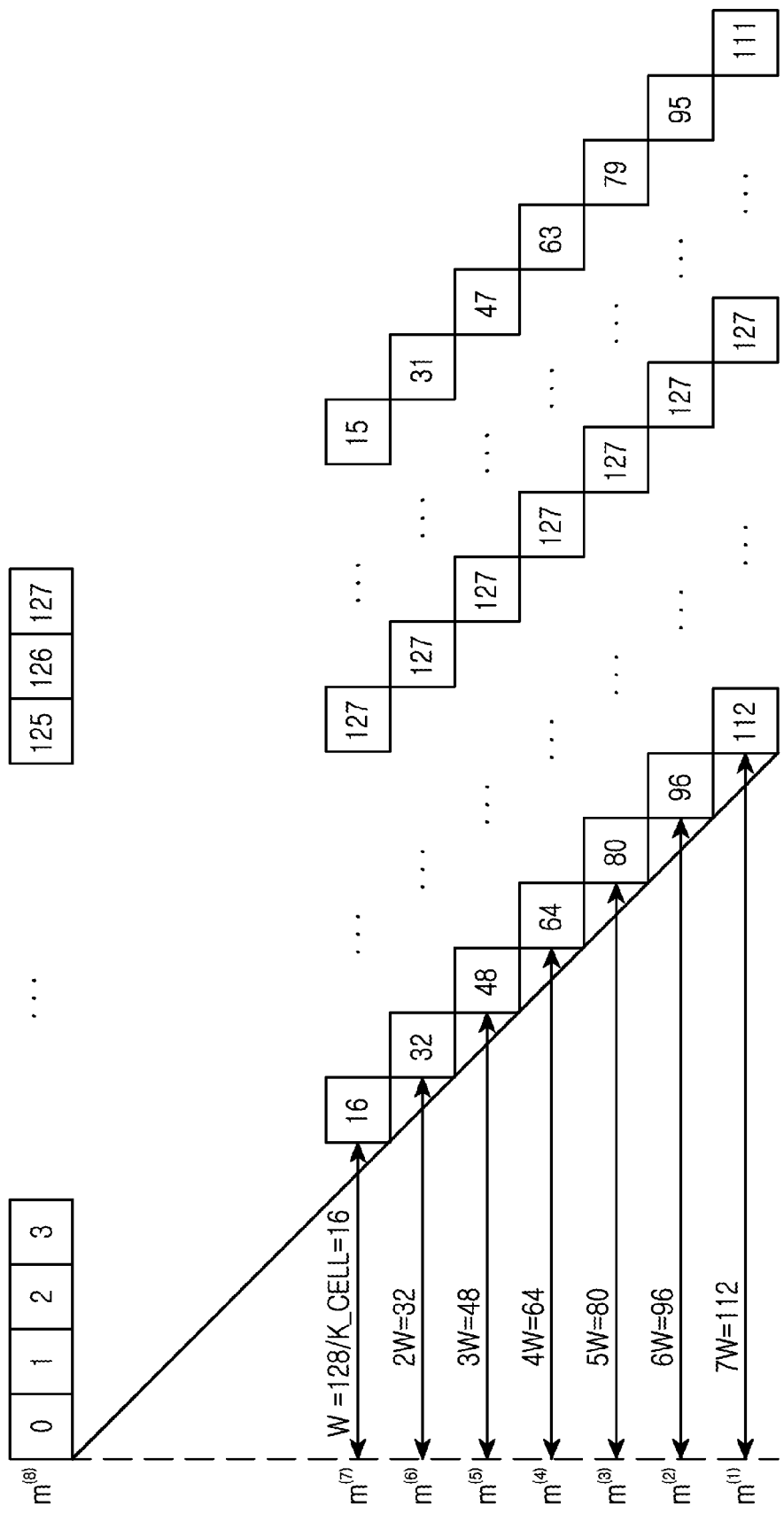
FIG. 6 is a diagram illustrating a structure of a midamble according to an embodiment of the present disclosure.

FIG. 6 is a diagram illustrating a structure of a midamble according to an embodiment of the present disclosure, for example, the midamble illustrated in FIG. 5C.

Referring to FIG. 6, if a sequence based on a given basic midamble index is shifted according to K_CELL, midamble sequences ($m^{(1)}$ to $m^{(8)}$) of 'K_CELL' number of 0 to K_CELL-1 are generated. Among the generated midamble sequences ($m^{(1)}$ to $m^{(8)}$), any one midamble sequence can be used as a midamble of a DL time slot. For example, if K_CELL=8 is given, a delay value (W=128/K_CELL) is determined and, among midamble sequences ($m^{(8)}$ to $m^{(1)}$) each corresponding to delay values (0, W, 2W, 3W, 4W, 5W, 6W, and 7W), any one midamble sequence can be used as the midamble of the DL time slot.

Referring again to FIG. 3, a description will be made for an operation of the multi-path search apparatus according to an embodiment of the present disclosure. According to an embodiment of the present disclosure, the multi-path search apparatus efficiently uses pilot related information basically necessary for a multi-path search technique and acquires multi-path related information of a good quality. This multi-path search technique is utilizable in a general CDMA series system as well as a TD-SCDMA system.

The multi-path search apparatus according to an embodiment of the present disclosure makes use of a diversity of combinations of pilot signals usable in a given communication system. For example, in the TD-SCDMA system, the multi-path search apparatus utilizes the SYNC-DL signal 12B existing within the special TS 10 of FIG. 4 and the midamble signals 20C existing within the plurality of DL time slots (TS0 (D) 20, TS3 (D) 23, TS4 (D) 24, TS5 (D) 25, and TS6 (D) 26) of FIG. 4, to detect multi-path information.

Also, the multi-path search apparatus according to an embodiment of the present disclosure performs a moving average or filtering work for a received signal value in various methods, thereby updating a path position every post accumulation size or every subframe. This updating operation is possible through a procedure of storing received data in a memory in an offline method and post-processing the stored data or a procedure of receiving data in an online method and simultaneously processing the received data.

Also, the multi-path search apparatus according to an embodiment of the present disclosure can use a signal processed through a received signal multi-level quantization process or use the energy itself of a received signal as it is.

The multi-level quantizer 100 of FIG. 3 performs multi-level quantization for a received signal at acquisition of path information of the received signal. That is, the multi-level quantizer 100 quantizes the received signal to an arbitrary level. For example, the multi-level quantizer 100 can perform binary quantization. The multi-level quantizer 100 can perform uniform quantization or perform non-uniform quantization. The multi-level quantizer 100 can define reception levels of various thresholds at a time, obtaining a threshold according to a reception level. As such, the multi-path search apparatus can utilize received data having passed through the multi-level quantizer 100 of a constant level, instead of using the received data as it is. If using the multi-level quantizer 100 as above, the multi-path search apparatus can exhibit an effect of obtaining robust performance even in a scenario and the like in which an uplink signal of another terminal is greatly strong under a TDD CDMA environment.

The multi-path search apparatus according to an embodiment of the present disclosure illustrated in FIG. 3 moves a window position while varying a correlation start position of a received signal (or received data) to be utilized, and performs sorting on the basis of a metric value every each window using a correlation characteristic of a pilot signal usable in a given subframe structure and acquires multi-path related information. This operation is carried out by the 1st code generator 104, the 2nd code generator 106, the 1st correlator 110A, the 2nd correlator 110B, the coupler 120, and the multi-path generator 130.

In the TD-SCDMA system, the multi-path search apparatus can utilize the midamble 20C of the DL time slot and the SYNC_DL 12B of the special TS 10 illustrated in FIG. 4 and FIGS. 5A to 5C. In this case, the 1st code generator 104 generates a code corresponding to the SYNC_DL 12B of the special TS 10, and the 2nd code generator 106 generates a code corresponding to the midamble 20C of the DL time slot. At this time, the midamble signal can include several shifted midamble signals.

The coupler 120 and the multi-path information generator 130 can coherently or noncoherently determine the energy of correlation values corresponding to each shifted midamble signal. Also, the coupler 120 and the multi-path information generator 130 can determine the energy of correlation values of each of a midamble code and a SYNC_DL code in a coherent or noncoherent method.

On the other hand, generally, the coupler 120 is impossible to coherently couple correlation values of two codes (i.e., a code of a Gold code series and a code of a PN code series) of different properties, but is possible to noncoherently couple the two codes of different properties. Accordingly, the coupler 120 interprets and uses the two codes as one code under a condition in which an auto-correlation characteristic and a cross-correlation characteristic are guaranteed for a kind of new code which is defined as a coherent sum of the two codes (i.e., the code of the Gold code series and the code of the PN code series). In this case, because exhibiting an effect of increasing a coherent length, the coupler 120 can effectively increase the entire detection performance of path search.

By additionally utilizing the midamble of the DL time slot as in an embodiment of the present disclosure, in a situation in which another cell belonging to the same SYNC_DL group act as interference, the multi-path search apparatus can effectively remove the interfering cell. This is because an index dividing cells is basically a midamble index. Particularly, as a situation in which cell planning is not normally accomplished, there is a possibility that cells belonging to the same SYNC_DL group have influence on each other's communication. In this case, an embodiment of the present disclosure can be effective.

As described above, the multi-path search apparatus according to an embodiment of the present disclosure processes pilot signals in a noncoherent method and forms a metric for each window. In the TD-SCDMA system, the multi-path search apparatus gets a correlation of a midamble signal and a SYNC_DL signal and forms a metric from this correlation. At this time, the multi-path search apparatus coherently or noncoherently gets a sum of midamble shifts possible to exist within the midamble signal, and coherently or noncoherently determines the energy of each of correlation values corresponding to the midamble signal and the SYNC_DL signal.

The multi-path search apparatus according to an embodiment of the present disclosure can vary a utilization procedure of a pilot signal according to a terminal mode. For example, in the TD-SCDMA system, in an initial synchronization acquisition step, the multi-path search apparatus utilizes a pilot which includes a midamble signal of the first time slot (TS0 (D)) of a downlink subframe and a SYNC-DL signal of a special TS. That is, the multi-path search apparatus utilizes all midamble shifts of the first time slot (TS0 (D)) and the SYNC_DL signal of the special TS because the multi-path search apparatus cannot know allocated midamble shift information in an initial cell search step, and is ignorant of K_CELL information of other DL time slots excepting K_CELL=8 of the first time slot (TS0 (D)).

In contrast, in a connected mode, the multi-path search apparatus utilizes a pilot which includes all midamble signals of the DL time slots, the SYNC_DL signal of the special time slot, and K-CELL information and midamble shift information of each DL time slot. That is, the multi-path search apparatus can use a form of a combination with the SYNC_DL signal of the special time slot, because the multi-path search apparatus is aware of a K_CELL value and allocated midamble shift information every DL time slot in a connected state after initial synchronization acquisition.

FIG. 7 is a flowchart illustrating an operation of a correlator according to an embodiment of the present disclosure, for example, the correlator illustrated in FIG. 3. The correlator can process received data of a corresponding window and a pilot signal in a partial correlation or full correlation method. Various differential correlation methods can be applied as well.

Referring to FIG. 7, in operation S210, the correlator determines a mode of a terminal. If the terminal is in an initial synchronization acquisition mode, in operation S220, the correlator performs a partial correlation operation. If the terminal is in a connected mode, in operation S230, the correlator performs a full correlation operation.

Figure 8:
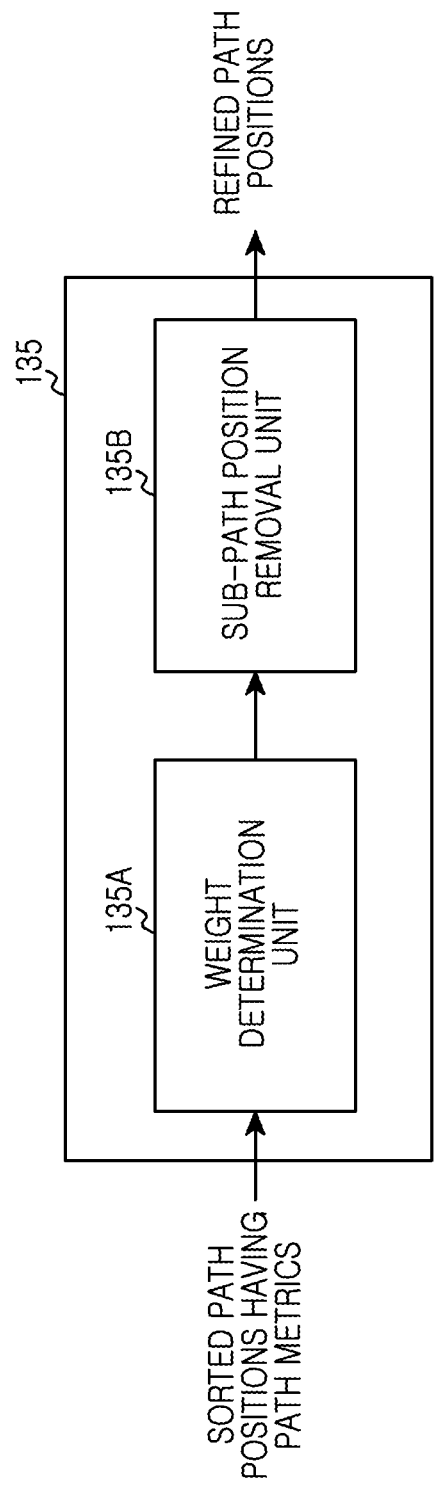
FIG. 8 is a block diagram illustrating a construction of a filtering unit connectable to a rear end of a multi-path information generator according to an embodiment of the present disclosure.

FIG. 8 is a block diagram illustrating a construction of a filtering unit connectable to a rear end of a multi-path information generator according to an embodiment of the present disclosure, for example, the multi-path information generator 130 illustrated in FIG. 3.

Referring to FIG. 8, the filtering unit 135 includes a weight determination unit 135A and a sub-path position removal unit 135B. The weight determination unit 135A inputs sorted path positions having path metrics as sorted multi-path information and determines a weight on a per-path-position basis. The sub-path position removal unit 135B removes arbitrary path positions of low weights among the inputted path positions and then, outputs the remnant path positions as refined path positions.

The filtering unit 135 inputs a path metric (i.e., mainly correlation power) per path position acquired by the multi-path information generator 130 of FIG. 3 and, through so-called filtering, the filtering unit 135 filters path positions of 'P' number not disregardable among sorted path positions of 'N' number and path metrics corresponding to the path positions of 'P' number. This filtering process may be executed linearly or may be executed nonlinearly. A linear filtering method or a nonlinear filtering method can be selected suitably according to implementation circumstances because of a trade-off relationship between complexity and performance.

Figure 9:
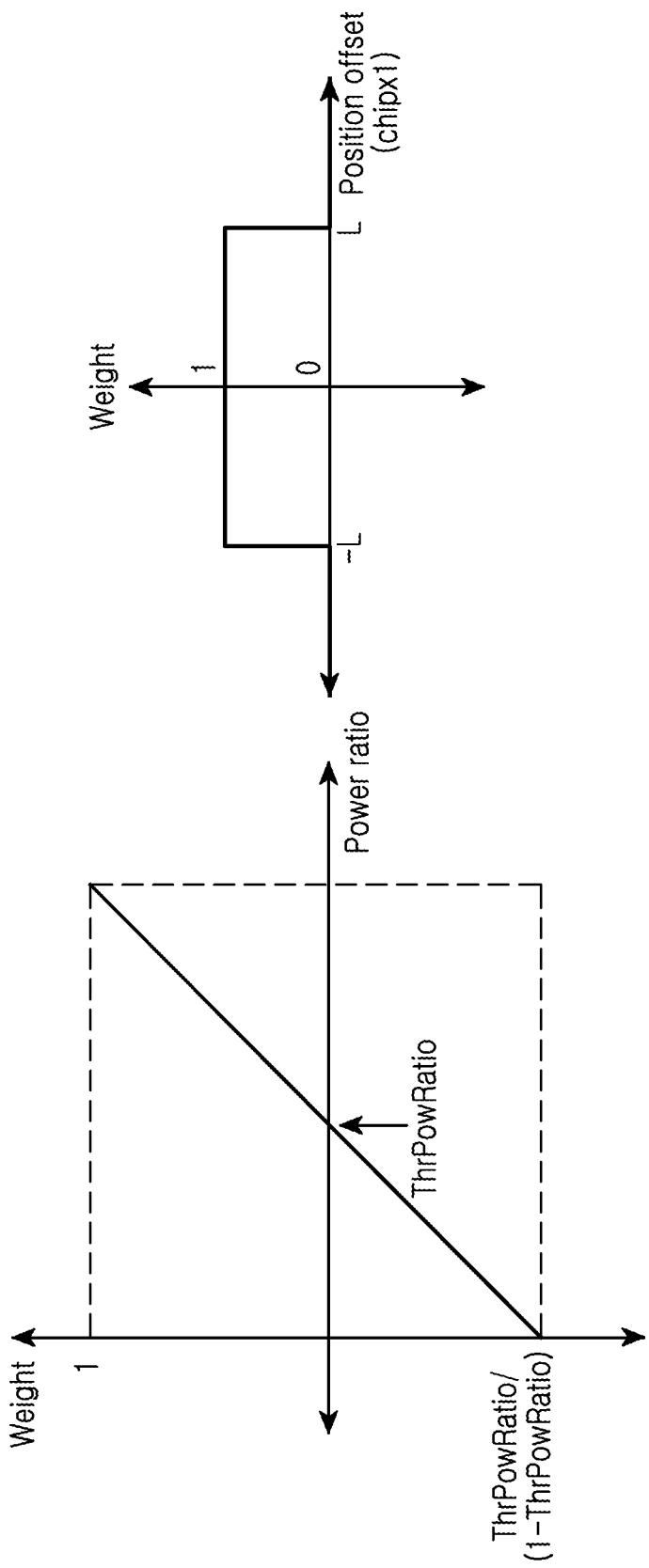
FIG. 9 is a graph illustrating an operation of a filtering unit according to an embodiment of the present disclosure.

FIG. 9 is a graph illustrating an operation of a filtering unit according to an embodiment of the present disclosure, for example, the filtering unit 135 illustrated in FIG. 8.

For example, the filtering unit 135 can perform a filtering operation in a linear method. Instead of determining a weight every each subframe, the weight determination unit 135A determines the weight every post accumulation size on the basis of power per path accumulated during post accumulation. In an embodiment, the weight determination unit 135A gets a maximum metric value among metric values per sorted path position, and determines a ratio compared to the maximum metric value on a per-path-position basis.

If intending to acquire reference timing from a power standpoint, as in FIG. 9, the filtering unit 135 allocates a weight of a linear form with a Power Ratio and a Threshold (ThrPowRatio). At this time, the threshold can be determined a value between '0' and '1'. After getting the weight on the per-path-position basis as above, the filtering unit 135 performs the filtering operation by comparing the weight with a predetermined threshold and maintaining only a weight greater than or equal to the predetermined threshold as an actually existing path position. The predetermined threshold can exist in several methods. For example, the predetermined threshold can include a form of scaling a certain number to an averaging weight.

In contrast, if intending to acquire reference timing from a timing standpoint, that is, if intending to acquire the reference timing on a basis of the earliest timing, the filtering unit 135 can determine as the reference timing the quickest path position among path positions of a case where a position offset is less than or is equal to a threshold (L) related with a Maximum Delay Spread (MDS) value. According to a characteristic of a fading channel, there is a case that the strongest path position can become a reference position, or there is a case that the quickest path position can become the reference position. Therefore, from a path detection standpoint, it is advantageous to determine the reference timing in a form of a combination of the two cases.

Figure 10:
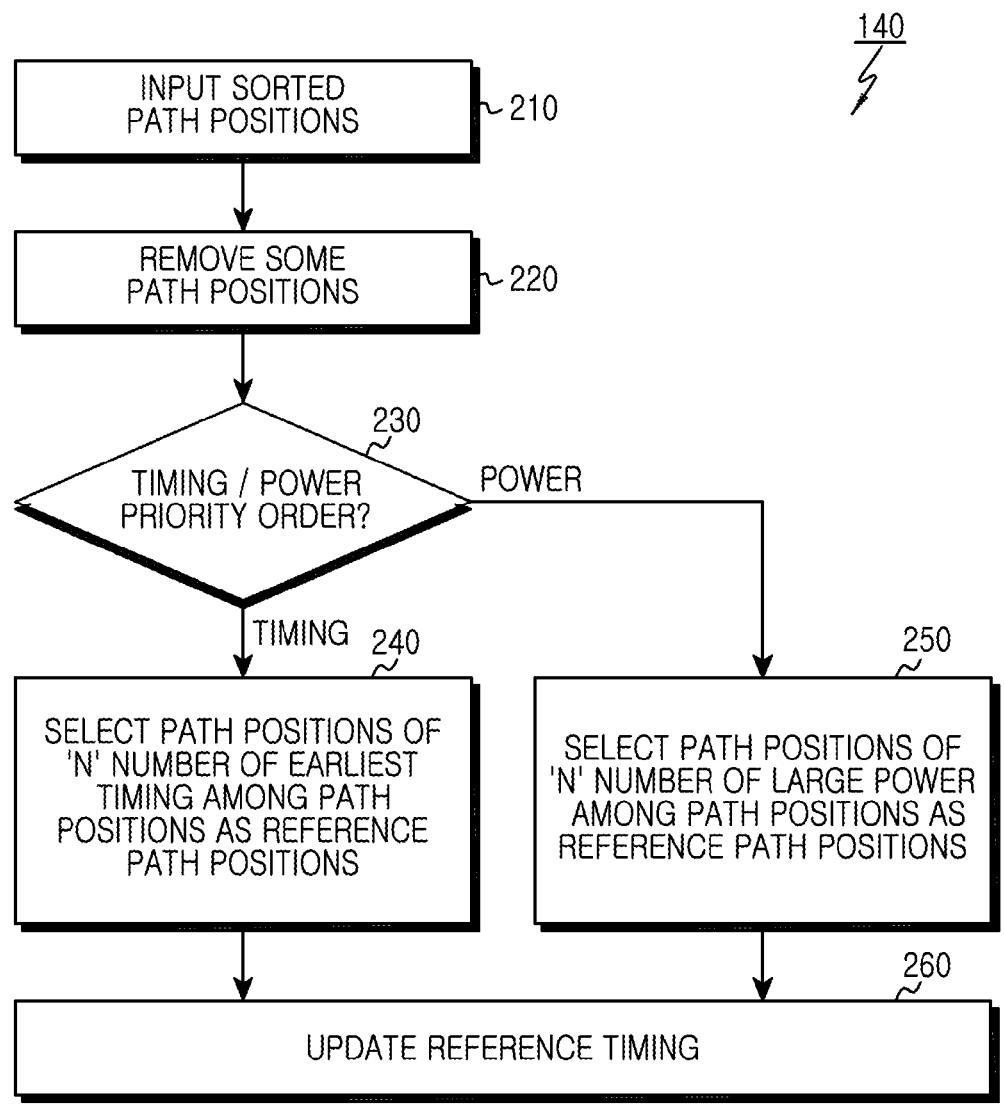
FIG. 10 is a flowchart illustrating an operation carried out by a reference timing acquirer according to an embodiment of the present disclosure.

FIG. 10 is a flowchart illustrating an operation carried out by a reference timing acquirer according to an embodiment of the present disclosure, for example, the reference timing acquirer 140 illustrated in FIG. 3.

The reference timing acquirer 140 can acquire reference timing according to priority order of timing, power, and a combination of the timing and the power in a given communication system.

Generally, various channels considered in a standard can have two main characteristics. The first is that the strongest path is a reference path. Mostly, the strongest path is a path of the earliest timing. Channel models (e.g., TC1, TC2, and TC3) of a TD-SCDMA system correspond to this case. The second is that the path of the earliest timing is the reference path. The channel model (e.g., TC2) corresponds to this case. The mentioned channel models are given as in Table 1 below.

TABLE 1

| TC1 (Indoor, speed 3 kmh) | | TC2 (Outdoor Pedestrian, speed 3 km/h) | | TC3 (Vehicular, speed 120 km/h) | |
|---|---|---|---|---|---|
| Relative delay [ns] | Relative mean power [dB] | Relative delay [ns] | Relative mean power [dB] | Relative delay [ns] | Relative mean power [dB] |
| 0 | 0 | 0 | 0 | 0 | 0 |
| 2928 | −10 | 2928 | 0 | 781 | −3 |
| | | 12000 | 0 | 1563 | −6 |
| | | | | 2344 | −9 |

To cover all the channel characteristics in an actually non-modeled communication environment, an algorithm satisfying the mentioned two kinds of channel conditions is needed. For this, in an embodiment of the present disclosure, the reference timing acquirer 140 acquires reference timing by using a refined path position acquired through the constructions illustrated in FIG. 3 and FIG. 8 and a weight corresponding to the refined path position. A criterion of acquiring the reference timing in the reference timing acquirer 140 can be timing or power. A procedure of acquiring the reference timing can be divided according to a priority item, and a criterion of selecting as in FIG. 10 is needed.

Equation 1 below represents a procedure of acquiring reference timing when putting timing as a criterion.

$$\underset{p}{\arg\min}\{PathWeight[p]\} \quad \text{Equation 1}$$

such that $$\underset{p \in [0,1,\ldots P-1]}{\arg}\{PathWeight[p] \geq AvgScalar * AvgWeight\}$$

In Equation 1 above, the 'PathWeight[p]' denotes a pth metric value when metric values per path position are sorted in order of large value to small value. The 'AvgScalar' denotes a control parameter and has a value of '0' to '1'. The 'AvgWeight' denotes an average value of metric values of 'P' number. As a result, among sorted path information, path positions exceeding a defined threshold are filtered and, among the filtered path positions, a path position of the earliest timing is regarded as a path position corresponding to the reference timing.

Referring to FIG. 10, in operation 210, the reference timing acquirer 140 inputs sorted path positions. In operation 220, the reference timing acquirer 140 removes some path positions among the inputted path positions. These operations 210 and 220 mean that the operation of the filtering unit 135 described before with reference to FIG. 8 is carried out within the reference timing acquirer 140. That is, with reference to FIG. 8, a description has been made for an example in which the filtering unit 135 filters multi-path information (i.e., path positions) generated by the multi-path information generator 130, and provides the filtering result to the reference timing acquirer 140. In another example, the operation of the filtering unit 135 may be carried out within the reference timing acquirer 140 as in the flowchart illustrated in FIG. 10.

In operation 230, the reference timing acquirer 140 determines whether a criterion (i.e., priority order) of reference timing acquisition is timing or power. If it is determined in operation 230 that the criterion of reference timing acquisition is the timing, in operation 240, the reference timing acquirer 140 selects path positions of 'N' number of the earliest timing among path positions, as reference path positions. Unlike this, if it is determined in operation 230 that the criterion of reference timing acquisition is the power, in operation 250, the reference timing acquirer 140 selects path positions of 'N' number of large power (i.e., strong received signals) among the path positions, as the reference path positions.

In operation 260, the reference timing acquirer 140 updates the reference timing using the selected reference path positions.

Figure 11:
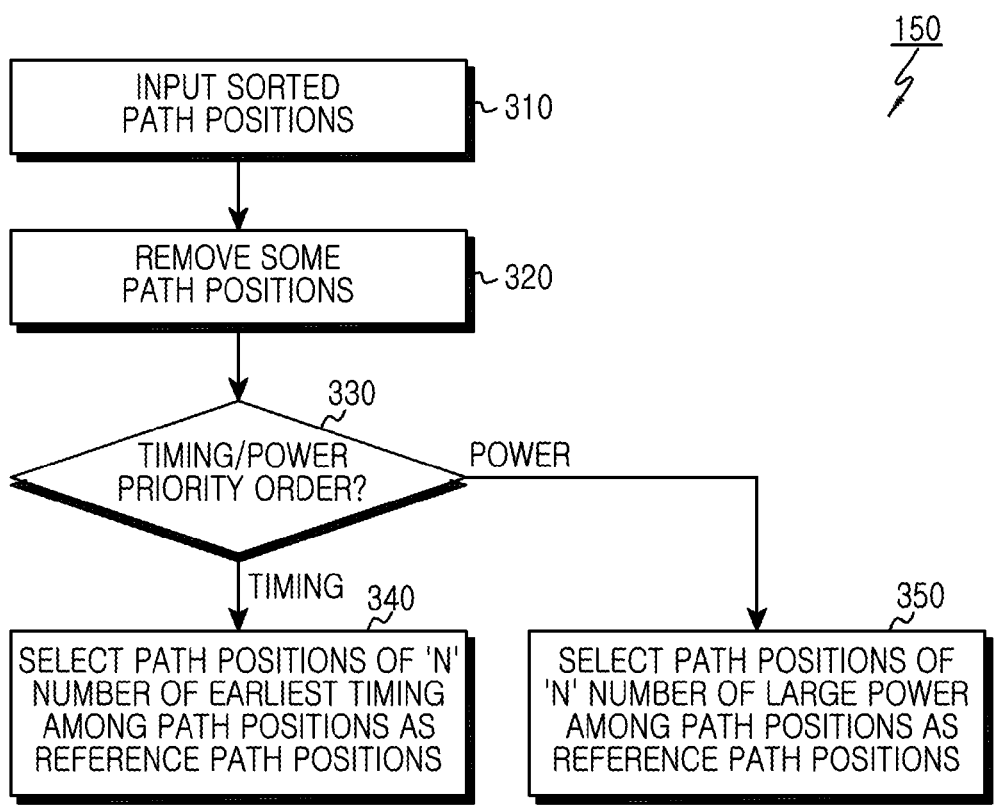
FIG. 11 is a flowchart illustrating an operation carried out by a multi-path position searcher according to an embodiment of the present disclosure.

FIG. 11 is a flowchart illustrating an operation carried out by a multi-path position searcher according to an embodiment of the present disclosure, for example, the multi-path position searcher 150 illustrated in FIG. 3.

To improve performance from a reliability and accuracy standpoint in several blocks, including a block correcting a frequency offset included in a receiver, there is a need to search a position using received data received from several multi-path positions. To support this, the multi-path position searcher 150 uses selected (i.e., or refined) path positions among path positions generated by the multi-path information generator 130. In an embodiment, because the multi-path position searcher 150 can be sensitive to timing or can be more sensitive to power according to a communication system, the multi-path position searcher 150 again sorts the selected sorted path information according to priority order (e.g., timing or power) and acquires multi-path information. For another example, it is possible to consider both the timing and time and consider a weight as well.

Referring to FIG. 11, in operation 310, the multi-path position searcher 150 inputs sorted path positions. In operation 320, the multi-path position searcher 150 removes some path positions among the inputted path positions. These operations 310 and 320 mean that the operation of the filtering unit 135 described before with reference to FIG. 8 is carried out within the multi-path position searcher 150. That is, with reference to FIG. 8, a description has been made for an example in which the filtering unit 135 filters multi-path information (i.e., path positions) generated by the multi-path information generator 130, and provides the filtering result to the multi-path position searcher 150. In another example, the operation of the filtering unit 135 may be carried out within the multi-path position searcher 150 as in the flowchart illustrated in FIG. 11.

In operation 330, the multi-path position searcher 150 determines whether a criterion (i.e., priority order) of multi-path position search is timing or power. If it is determined in operation 330 that the criterion of multi-path position search is the timing, in operation 340, the multi-path position searcher 150 selects path positions of 'N' number of the earliest timing among path positions, as reference path positions. Unlike this, if it is determined in operation 330 that the criterion of multi-path position search is the power, in operation 350, the multi-path position searcher 150 selects path positions of 'N' number of large power (i.e., strong received signals) among the path positions, as the reference path positions.

Figure 12:
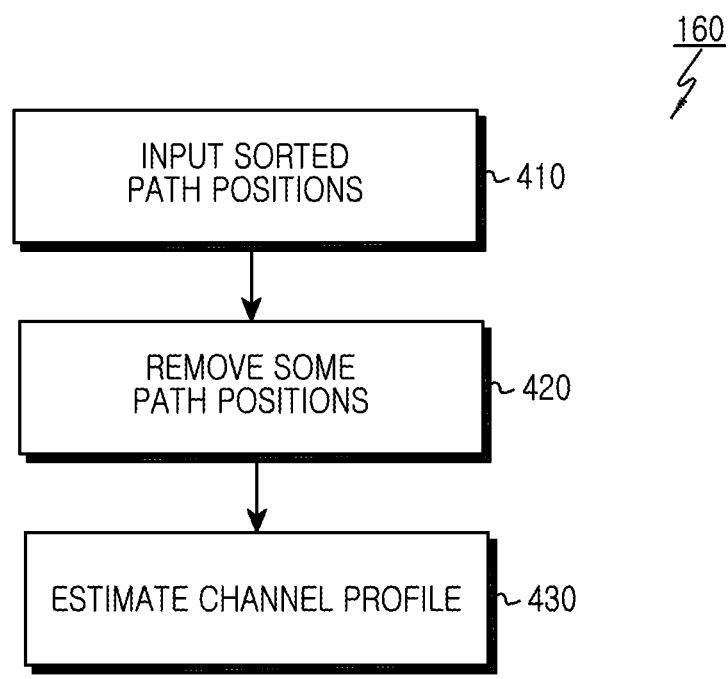
FIG. 12 is a flowchart illustrating an operation carried out by a channel profile estimator according to an embodiment of the present disclosure.

FIG. 12 is a flowchart illustrating an operation carried out by a channel profile estimator according to an embodiment of the present disclosure, for example, the channel profile estimator 160 illustrated in FIG. 3. The flowchart illustrated in FIG. 12 corresponds to an operation of estimating a channel profile that includes an MDS using filtered multi-path information.

There is a case that the channel profile estimator 160 very usefully uses a channel profile including an MDS value of a channel environment according to a communication system. This is because all algorithms utilized in the communication system are generally difficult to guarantee robust performance against all channels by specific parameters of a specific algorithm. Accordingly, if the channel profile estimator 160 indirectly knows information about which channel it is through the estimated channel profile, according to this, it is easy to effectively optimize the respective algorithms. In an embodiment of the present disclosure, the channel profile estimator 160 can estimate channel profile related information values such as a delay per each path, the number of valid paths, an MDS and the like.

Referring to FIG. 12, in operation 410, the channel profile estimator 160 inputs sorted path positions. In operation 420, the channel profile estimator 160 removes some path positions among the inputted path positions. These operations 410 and 420 mean that the operation of the filtering unit 135 described before with reference to FIG. 8 is carried out within the channel profile estimator 160. That is, with reference to FIG. 8, the filtering unit 135 filters multi-path information (i.e., path positions) generated by the multi-path information generator 130, and provides the filtering result to the channel profile estimator 160. In another example, the operation of the filtering unit 135 may be carried out within the channel profile estimator 160 as in the flowchart illustrated in FIG. 12.

In operation 430, the channel profile estimator 160 estimates channel profile related information values such as a delay per each path, the number of valid paths, an MDS and the like, using the filtered multi-path information (i.e., path positions).

Figure 13:
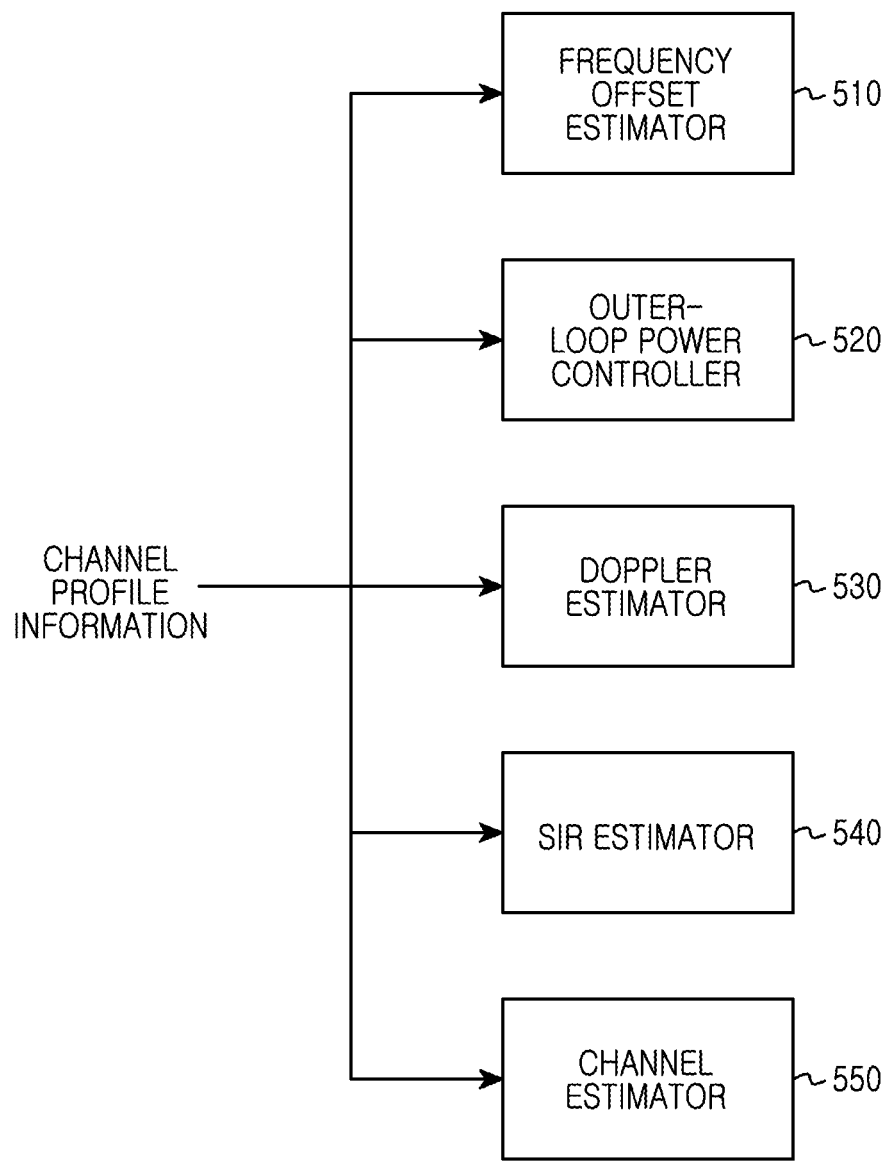
FIG. 13 is a diagram illustrating an example in which channel characteristic information is estimated according to an embodiment of the present disclosure.

FIG. 13 is a diagram illustrating an example in which channel characteristic (e.g., profile) information is estimated according to an embodiment of the present disclosure.

Referring to FIG. 13, channel profile information or a channel state indicator obtained from the channel profile information can be provided to the various receiver blocks. For example, the receiver blocks can include a frequency offset estimator 510, an outer-loop power controller 520, a Doppler estimator 530, a Signal-to-Interference Ratio (SIR) estimator 540, and a channel estimator 550. The channel characteristic (i.e., or profile) information can be used in receiver blocks other than the constituent elements illustrated herein.

The various receiver blocks can perform a suitable operation using an MDS value acquired by the channel profile estimator 160 or a degree of dispersiveness of a channel profile. If power values of several paths are similar with one another, the frequency offset estimator 510 can estimate more accurate frequency offset using a SYNC_DL or midamble signal received on a per-path basis in a timing position of each path provided in a multi-path searcher. The outer-loop power controller 520 performs a power control operation by using a power control parameter set that is optimized using the channel profile information. The Doppler estimator 530 more accurately estimates a Doppler value using each channel profile information. Because of a deflection dependent on a channel profile, the SIR estimator 540 can use the channel profile information for more accurate SIR estimation. If an MDS is increased greater than a specific value, because the channel estimator 550 exceeds a window size allocated for a preset channel estimator, working and parameter use optimized to this condition are possible. Accordingly, related blocks can be efficiently worked with multi-path information generated in the multi-path searcher.

Figure 14:
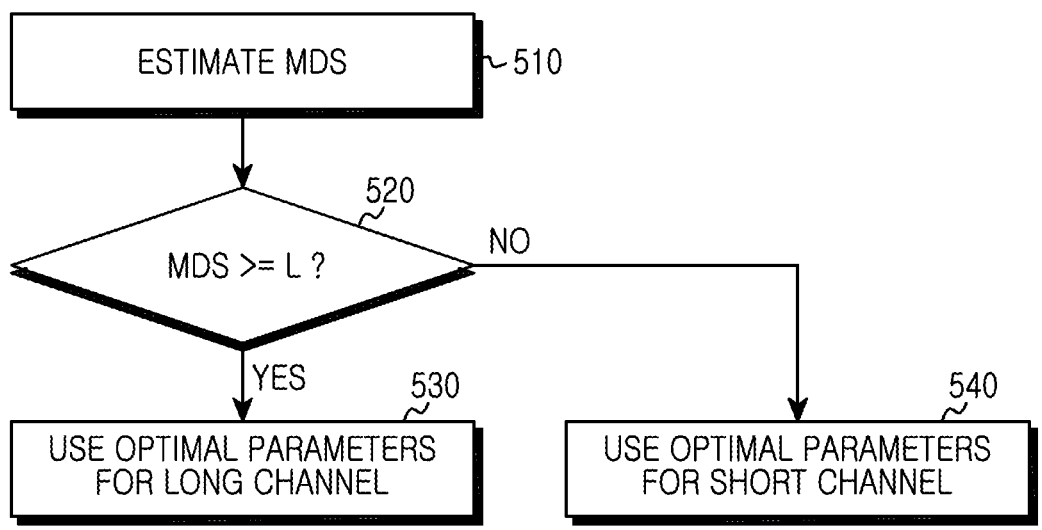
FIG. 14 is a flowchart illustrating that a multi-path search operation works adaptively with channel characteristic information estimated according to an embodiment of the present disclosure.

FIG. 14 is a flowchart illustrating that a multi-path search operation works adaptively with channel characteristic information estimated according to an embodiment of the present disclosure.

In an algorithm of a multi-path searcher, commonly, an optimal parameter and the like have no choice but to be different according to a channel characteristic. In an embodiment of the present disclosure, an algorithm including a parameter of multi-path search differently works for a channel exhibiting a long channel profile in which an estimated MDS value is greater than or is equal to a certain value (L) and otherwise channel.

Referring to FIG. 14, in operation 510, an MDS is estimated. In operation 520, it is determined if the estimated MDS value is greater than or is equal to the certain value (L). If the estimated MDS value is greater than or is equal to the certain value (L), in operation 530, optimal parameters are used for a long channel (e.g., TC2). If the estimated MDS value is less than the certain value (L), in operation 540, the optimal parameters are used for a short channel (e.g., TC1, TC3).

Figure 15:
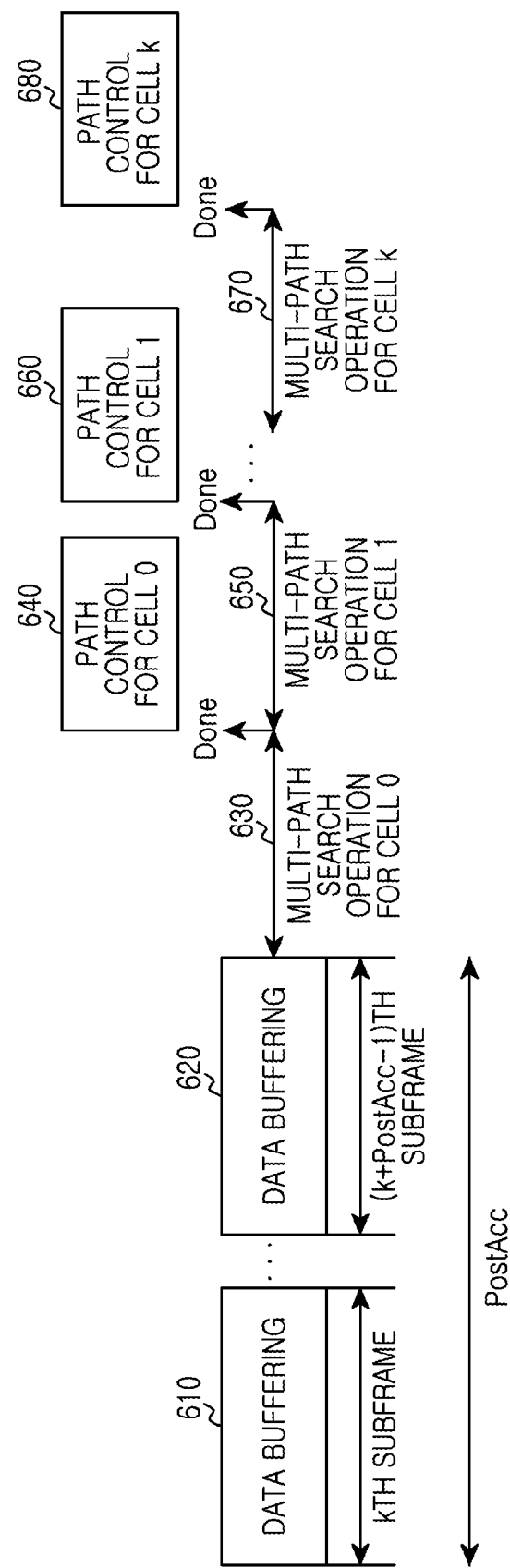
FIG. 15 is a diagram illustrating that a multi-path search operation according to an embodiment of the present disclosure works in a multi-cell environment.

FIG. 15 is a diagram illustrating that a multi-path search operation according to an embodiment of the present disclosure works in a multi-cell environment.

To enhance system performance, such as reception performance of a communication system, and the like, even path information of a neighbor cell as well as path related information of a serving cell is sometimes used. In an embodiment of the present disclosure, as a method capable of effectively getting the path information of the neighbor cell, an offline mode multi-path search method is proposed as in FIG. 15. The offline mode multi-path search method stores received data through buffering and controls paths of the serving cell and the neighbor cell in sequence to get the path information. There can also be a method of working a multi-path searcher in parallel so as to increase a speed of path control during a given time. Therefore, the parallel method and the offline mode multi-path search method can be suitably combined and worked according to system requirements. Also, under this condition, an algorithm for all processing operations mentioned above can be applied.

Referring to FIG. 15, in operation 610, data buffering is performed for a kth subframe. In operation 620, data buffering is performed for a (k+PostAcc−1)th subframe. In operation 630, a multi-path search operation for cell 0 is performed. In operation 640, a path for cell 0 is controlled using the searched multi-path information. In operation 650, a multi-path search operation for cell 1 is performed. In operation 660, a path for cell 1 is controlled using the searched multi-path information. After that, in a similar method, a multi-path search and path control operation is performed. In operation 670, a multi-path search operation for cell k is performed. In operation 680, a path for cell k is controlled using the searched multi-path information.

As described above, various embodiments of the present disclosure propose a multi-path search apparatus and method capable of improving the performance of multi-path search and the performance of the whole system by searching a multipath using even a signal other than an existing pilot signal used for a multi-path search operation in a wireless communication system. For example, by additionally utilizing a signal (e.g., a midamble code) for channel estimation allocated to a downlink slot as well as a pilot signal (e.g., a SYNC_DL code) for downlink synchronization specified in a specification in a TD-SCDMA communication system, the multi-path search apparatus and method increase the performance of detection of a multi-path searcher, improving the whole system performance.

Certain various embodiments of the present disclosure have the following effects.

The present disclosure can increase the reliability of a correlation value becoming a basis of the performance of a multi-path searcher by making efficient use of several metrics and resources (e.g., in a case of a TD-SCDMA system, a basic midamble code and a SYNC_DL code) in getting multi-path information.

The present disclosure can work a communication system robust against a timing change having an influence upon the performance of the whole communication system.

The present disclosure can facilitate parameter optimization according to channel environment change by indirectly providing channel information to respective blocks of a communication system.

The present disclosure can improve performance in a multi-cell environment and a cell boundary area by providing path information of several cells and an MDS value (i.e., the degree of dispersiveness of a channel profile) that are concrete metrics capable of being optimized to a chip level processing block.

A computer-readable recording media can record a program instruction for performing an operation implemented by various computers according to an embodiment of the present disclosure. The computer-readable recording media can include a program instruction, a data file, a data structure and the like singularly or in combination. The program instruction can be an instruction specially designed and constructed for the present disclosure or can be an instruction known to and usable by ordinary people. An example of the computer-readable recording media includes a magnetic media such as a hard disk, a floppy disk, and a magnetic tape, an optical recording media such as a Compact Disc-Read Only Memory (CD-ROM) and a Digital Versatile Disc (DVD), a Magneto-Optical Media such as a floptical disk, and a hardware device specially configured to store and perform a program instruction such as a Read Only Memory (ROM), a Random Access Memory (RAM), a flash memory and the like. Also, the program instruction includes, for example, not only a mechanical code such as a code made by a compiler but also a high-level language code executable by a computer using an interpreter and the like. If all or some of base stations or relays described in the present disclosure are implemented by a computer program, even the computer-readable recording media storing the computer program is included in the present disclosure. Therefore, the spirit and scope of the disclosure should not be defined by the described various embodiments, and should be defined by the appended claims and equivalents to the appended claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of a terminal in a wireless communication system, the apparatus comprising:
   at least one transceiver; and
   at least one processor operatively couple to the at least one transceiver and configured to:
      generate a third value by coupling a first value and a second value, and
      generate information regarding a multi-path by using a correlation power determined based on the third value,
   wherein the first value is generated based on a received signal and a first code, and
   wherein the second value is generated based on the received signal and a second code.

2. The apparatus of claim 1, wherein the first code comprises at least one of a code of a gold code series and a pilot signal component configured to synchronize to links.

3. The apparatus of claim 1, wherein the second code comprises at least one of a code of a pseudo noise (PN) code series and a signal component for channel estimation.

4. The apparatus of claim 1, wherein the processor is further configured to quantize the received signal to a predefined level.

5. The apparatus of claim 1, wherein the processor is further configured to filter at least one path position from among path positions of the information regarding the multi-path.

6. The apparatus of claim 5, wherein the processor is further configured to control at least one of:
   acquiring reference timing using the filtered information;
   searching a multi-path position using the filtered information; and
   estimating a channel profile using the filtered information.

7. An apparatus of a terminal of a time division duplex (TDD) wireless communication system, the apparatus comprising:
   at least one transceiver; and
   at least one processor operatively coupled to the at least one transceiver and configured to:
      generate a third value by coupling a first value and a second value, and
      generate information regarding a multi-path by using a correlation power determined based on the third value,
   wherein the first value is generated by correlating a received signal and a first code comprising a pilot signal component for downlink synchronization, and
   wherein the second value is generated by correlating the received signal and a second code comprising a signal component for channel estimation.

8. The apparatus of claim 7, wherein, in an initial synchronization acquisition mode, the second value is generated by using all midamble sequences comprised in one of downlink time slots of the received signal and, in a connected mode, gets the second value is generated by using midamble sequences allocated to each of the downlink time slots of the received signal.

9. The apparatus of claim 7, wherein the processor is further configured to quantize the received signal to a predefined level.

10. The apparatus of claim 7, wherein the processor is further configured to filter at least one path position from among path positions of the information regarding the multi-path.

11. The apparatus of claim 10, wherein the processor is further configured to control at least one of:
    acquiring reference timing using the filtered information;
    searching a multi-path position using the filtered information; and
    estimating a channel profile using the filtered information.

12. A method for operating an apparatus of a terminal in a wireless communication system, the method comprising:
    generating a third value by coupling a first value and a second value; and
    generating information regarding a multi-path by using a correlation power determined based on the third value,
    wherein the first value is generated based on a received signal and a first code, and
    wherein the second value is generated based on the received signal and a second code.

13. The method of claim 12, wherein the first code comprises at least one of a code of a gold code series and a pilot signal component configured to synchronize links.

14. The method of claim 12, wherein the second code comprises at least one of a code of a pseudo noise (PN) code series and a signal component for channel estimation.

15. The method of claim 12, further comprising:
quantizing the received signal to a predefined level.

16. The method of claim 12, further comprising:
filtering at least one path position form among path positions of the information regarding the multi-path.

17. The method of claim 16, further comprising at least one of:
acquiring reference timing using the filtered information;
searching a multi-path position using the filtered information; and
estimating a channel profile using the filtered information.

18. A method for operating an apparatus of a terminal of a time division duplex (TDD) wireless communication system, the method comprising:
generating a third value by coupling a first value and a second value; and
generating information regarding a multi-path by using a correlation power determined based on the third value,
wherein the first value is generated by correlating a received signal and a first code comprising a pilot signal component for downlink synchronization, and
wherein the second value is generated by correlating the received signal and a second code comprising a signal component for channel estimation.

19. The method of claim 18,
wherein,
in an initial synchronization acquisition mode, the second value is generated by using all midamble sequences comprised in a one of downlink time slots of the received signal, and
wherein, in a connected mode, the second value is generated by using midamble sequences allocated to each of the downlink time slots of the received signal.

20. The method of claim 18, further comprising:
quantizing the received signal to a predefined level.

21. The method of claim 18, further comprising:
filtering at least one path position from among path positions of the information regarding the multi-path.

22. The method of claim 21, further comprising at least one of:
acquiring reference timing using the filtered information;
searching a multi-path position using the filtered information; and
estimating a channel profile using the filtered information.

* * * * *